United States Patent [19]

McCoubrey

[11] 4,242,044
[45] Dec. 30, 1980

[54] COMPENSATING STRUCTURE FOR CIRCULATION CONTROL ROTOR PNEUMATIC VALVE

[75] Inventor: George A. McCoubrey, Westfield, Mass.

[73] Assignee: The United States of America as represented by the Secretary of the Navy, Washington, D.C.

[21] Appl. No.: 56,590

[22] Filed: Jul. 11, 1979

[51] Int. Cl.³ .............................................. B64C 27/18
[52] U.S. Cl. ................................ 416/20 A; 416/90 A
[58] Field of Search ............... 416/20 A, 20 R, 90 A

[56] References Cited

U.S. PATENT DOCUMENTS

| | | | |
|---|---|---|---|
| 2,454,040 | 11/1948 | Dalton | 416/20 A |
| 3,073,394 | 1/1963 | Laufer | 416/20 A |
| 3,412,680 | 11/1968 | Girard | 416/20 A X |
| 3,830,588 | 8/1974 | Nagler | 416/20 A |
| 3,904,313 | 9/1975 | Bernaerts | 416/20 A |
| 3,917,435 | 11/1975 | Wilkerson et al. | 416/20 R |
| 3,918,833 | 11/1975 | Eilertson | 416/20 R |
| 3,990,811 | 11/1976 | Danielson | 416/20 R |

FOREIGN PATENT DOCUMENTS

| | | | |
|---|---|---|---|
| 1269890 | 6/1968 | Fed. Rep. of Germany | 416/20 A |
| 1446212 | 6/1966 | France | 416/20 A |

*Primary Examiner*—Everette A. Powell, Jr.

[57] ABSTRACT

Structure for minimizing gap changes in a circulation control pneumatic valve. A flat, flexible ring is located below and adjacent to the plane of the nozzle of blade ducts. The flat, flexible ring is supported from beneath by an array of actuators. In one embodiment, the nozzles are immobilized relative to hub-induced displacements and thus eliminate any feedback due to hub flexing. In another embodiment, the nozzle is pivotally attached to a rotating carrier and feedback is reversed so that feedback becomes negative.

10 Claims, 5 Drawing Figures

COMPENSATING STRUCTURE FOR CIRCULATION CONTROL ROTOR PNEUMATIC VALVE

BACKGROUND OF THE INVENTION

The present invention relates to structure for controlling feedback in a circulation control pneumatic valve and more particularly to means for mounting the nozzles of air ducts which carry air to a rotor blade.

Presently, maximum useable airspeed in helicopters is limited because of loss of lift and other problems encountered with helicopter rotors at high speeds. At any given instant, one or more rotor blades, referred to as "the advancing blade", are in the part of their rotation cycle where the effective airspeed experienced is the sum of their rotational velocity and the helicopter's forward airspeed. At the same time, the blade or blades mounted on the rotor opposite the advancing blade experience an effective airspeed equal to their rotational velocity less the forward airspeed of the helicopter. These blades are referred to as "the retreating blade". It will be appreciated that as helicopter forward airspeed increases, the effective airspeed at the advancing blade increases, while the effective airspeed at the retreating blade decreases. Since the contribution to total effective airspeed of the rotor blade due to the blade's rotational velocity is a function of the radial distance from the rotor hub, the point on the rotor experiencing the highest total effective airspeed is at the tip of the advancing blade, while the lowest total effective airspeed will be found near the root of the retreating blade. Both of these effects lead to problems at high speeds.

The main problem associated with the rotor when the helicopter is at high airspeed involves loss of lift on the retreating rotor blade, due to low effective airspeed and high angle of attack. The angle of attack of the retreating blade is increased at high helicopter airspeed because the induced velocity becomes large in relation to the oncoming free stream velocity. When the angle of attack reaches about 14° the airfoil section stalls and the lift is appreciably reduced. The low effective airspeed experienced by the retreating blade when the helicopter is at high airspeed also contributes to loss of lift. At still higher helicopter airspeeds a portion of the retreating blade near the rotor hub actually experiences reverse flow, i.e., airflow from trailing edge to leading edge, because the helicopter forward airspeed exceeds the product of rotational velocity times distance from the rotor hub. This region of reverse flow extends further outward on the retreating blade as helicopter airspeed continues to increase. Heretofore, this region has been relatively useless for producing lift, and in fact has contributed to much buffeting and vibration of the rotor blade.

One conventional means for altering the lift of helicopter blades is to cyclically alter the blade angle of attack and the blade speed. This has been accomplished by mechanical means.

A second method employs a circulation control rotor blade which carries air for circulation control blowing. A number of slots are provided in the blade and, as the blade is rotated, air is blown out these slots in a thin sheet. The thin sheet adheres to the trailing edge and remains attached, by the Coanda effect, until it reaches the separation point on the blade under side, beneath the trailing edge. The point of separation beneath the trailing edge is determined by the intensity of blowing. The effect of the circulation control is to relocate the stagnation stream lines and produce a higher lift on the foil, the lift on the airfoil being functionally related to the ratio of the velocity of the blown air to the free stream velocity blowing over the rotating wing.

A fundamental part of the circulation control rotor concept is a pneumatic control valve which controls the distribution of the circulation control airflow around the rotor disc. Collective control is achieved by supplying a uniform airflow through all blades simultaneously, and cyclic control is obtained by modulating the airflow to each blade azimuthally, once per revolution.

One type of valve being used experimentally on military aircraft is a flex ring valve which uses a flat flexible ring located below and adjacent to the plane of the nozzles. The flexible ring is supported from beneath by an array of actuators of relatively short stroke. One disadvantage to the aforementioned flex ring valve is the occurrence of unwanted levels of feedback control input from sources other than the control system itself. For example, consider the case in which a valve has commanded a collective increase in the lift of all blades of the circulation control rotor to initiate a rate of climb for a change in cruise altitude. To accomplish this change, a control linkage system for the valve would displace the entire valve assembly and its supporting ring and central pivot downwards, thereby increasing the gap between the flexible ring valve plate and the blade nozzle. With the larger entry area thus exposed, the pressure drop through the flow constriction at the gap would decrease and the flow through the valve increase, thereby raising the pressure in the blade duct. The increased flow from the blade duct through the circulation control blowing slot near the blade trailing edge would then induce the desired lift increase from the rotor blades. The increased rotor thrust would cause the rotor hub to rise, minutely, due to the small but significant elastic deformations of the hub itself, the rotation bearings and the stationary mast/plenum. This upwards displacement of the hub would carry with it the blade duct nozzles, but since the value assembly is mounted, effectively, from the lower porton of the stationary mast, the valve assembly would not experience a comparable upward displacement and thus the air gap would increase. An increase in the air gap will produce an increase in blade lift and this lift change would tend to further open the air gap. Such a condition is unstable in character since the response to control input results in a positive feedback and causes an overshoot of the desired output. This overshoot opens the possibility that unstable oscillations could occur.

SUMMARY OF THE INVENTION

The present invention relates to structure for minimizing and/or controlling gap changes in a circulation control pneumatic valve so as to minimize or control feedback resulting from deformation of the control elements and the supporting structure.

A flex ring valve is employed which has a rotating blade nozzle and a flex ring plate which is movable so that the gap between the blade nozzle and the flex ring plate can be controlled. Movement of the flex ring plate is accomplished by various links, lever and bellcranks which connect the helicopter cockpit flight controls with the valve. A coil spring is provided between the rotor support structure and the valve central support in order to eliminate all linkage free-play in the collective portion of the control system.

Although the blade nozzles are rotating, a constraint-to-ground for the nozzles is provided by having a rotating carrier mounted to a stationary standpipe and by attaching the inner ends of the blade nozzles to the rotating member. In one embodiment, the nozzles are rigidly attached to the rotating carrier and thus the nozzles are immobilized relative to hub-induced displacements thereby eliminating the feedback input. In another arrangement, the nozzles are pivotally attached to the rotating carrier so that feedback is reversed and becomes negative and stable.

It is therefore a general object of the present invention to minimize and control gap changes in a circulation control pneumatic valve in order to reduce feedback resulting from deformation of control elements.

Another object of the present invention is provided for positive feedback caused by deformation of control elements thereby creating a stable condition.

Other objects and advantages of the present invention will be apparent from the following specification and accompanying drawings.

DESCRIPTION OF THE PREFERRED EMBODIMENT

Figure 1:
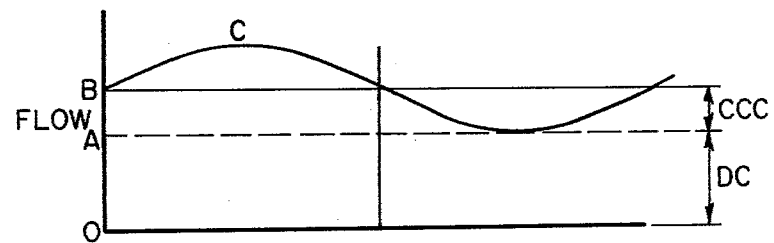
FIG. 1 is a diagram showing airflow requirements for a circulation control rotor system.

A fundamental part of the circulation control rotor concept is a pneumatic control valve which controls the distribution of the circulation control airflow around a rotor disc. Collective control is achieved by supplying a uniform flow through all rotor blades simultaneously, and cyclic control is obtained by modulating the airflow to each blade azimuthally, once per revolution. Referring to FIG. 1 of the drawings, there is shown a simplified concept of flow required by a rotor blade. In a normal forward flight condition, each rotor blade will require a direct collective (DC) flow (level A in FIG. 1), with a cyclic flow imposed upon the DC flow, as shown by curve C. The effective collective flow to each rotor blade is then OB, which is the sum of the direct collective component OA and a cyclic coupled collective component AB. The minimum collective airflow is the cyclic coupled collective component of cyclic airflow required for a given aircraft trim or maneuver condition.

Figure 2:
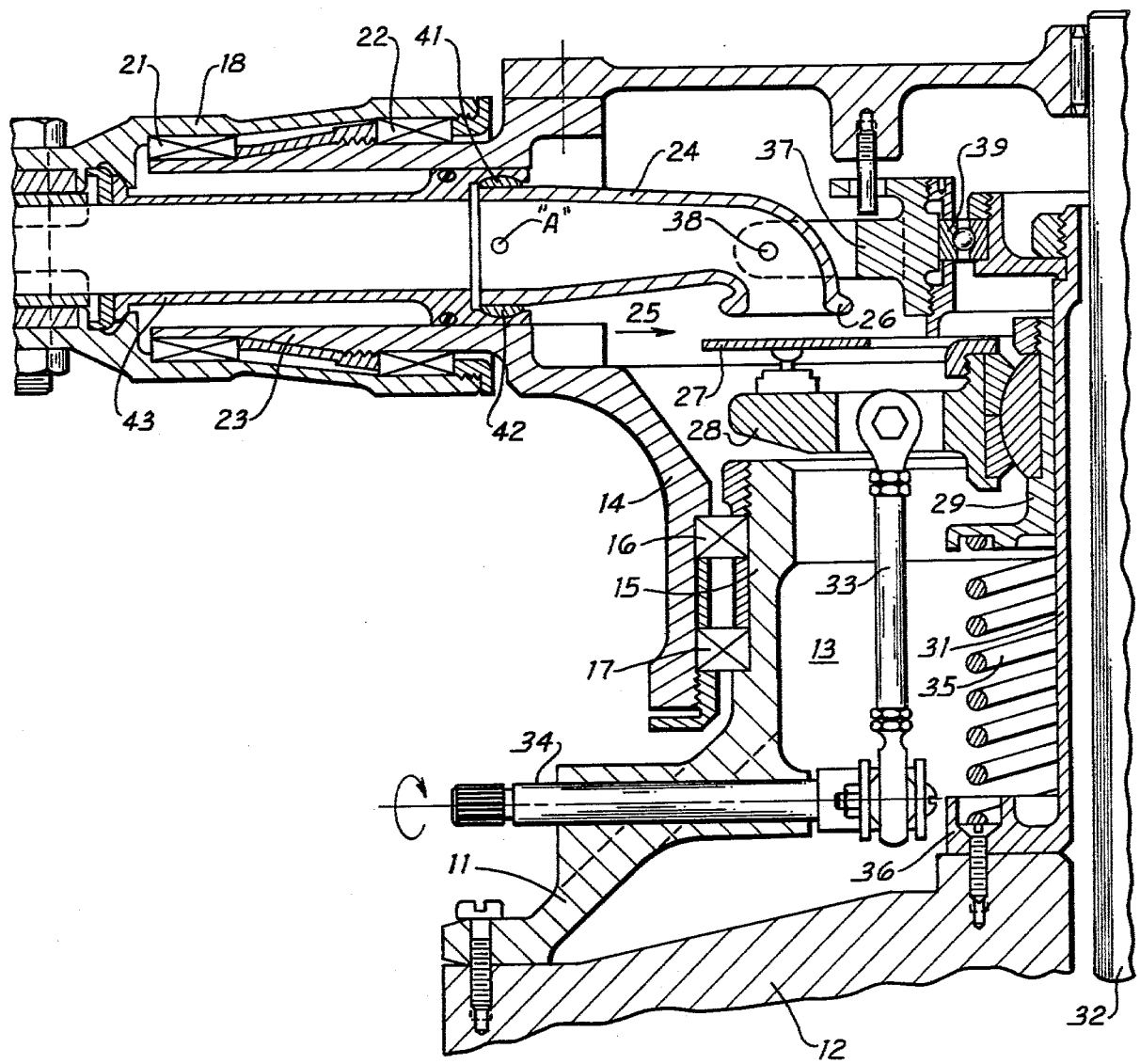
FIG. 2 is a partial sectional view showing a control valve arrangement for a helicopter.

Referring now to FIG. 2 of the drawings, a rotor mast 11 is attached to a fuselage 12 of a helicopter and rotor mast 11 is positioned so that a drive connection can be made from a transmission to the rotor blades. The inside of rotor mast 11 forms the lower portion of an air plenum 13 which is supplied air from a compressor. A rotor hub 14 is rotatably supported on a cylindrical portion 15 of rotor mast 11 by bearings 16 and 17, and a plurality of rotor blades 18 are supported on rotor hub 14. Each rotor blade 18 is rotatably mounted by bearings 21 and 22 on a pitch axle 23 to permit control of the pitch angles of rotor blades 18.

Air from plenum 13 is distributed to rotor blades 18 through air ducts 24 and flow of air into ducts 24 is controlled by flex ring valves 25. The inlet to ducts 24 are air nozzles 26, which open downwardly, have coplanar entrances, and rotate with the rotor hub 14. The remainder of the flex ring valves 25 remains fixed with respect to the aircraft with control elements moving only in response to control inputs. An annular, flat, flexible ring 27 is located below and adjacent to the plane of the nozzles and is supported from beneath by an array of valve carriers 28 which are pivotally attached to a support 29 which is slidably mounted around a standpipe 31. Standpipe 31 is physically attached, as by screws, to fuselage 12. By way of example, three valve carriers 28 might be equi-spaced at 120 degrees around the center line of rotor shaft 32 and, for rotor cyclic-control, are displaced differentially to tilt the flexible ring 27 and produce an air gap that varies sinusoidally as each blade nozzle 26 rotates above the fixed flexible ring 27. A lever 33 is provided for each valve carrier 28, and lever 33 is raised and lowered by rotation of a shaft 34 which is operated by the aircraft controls. A spring 35 is provided between the base 36 of standpipe 31 and support 29 in order to effectively eliminate all linkage free-play in the collective portion of the control system.

Figure 3:
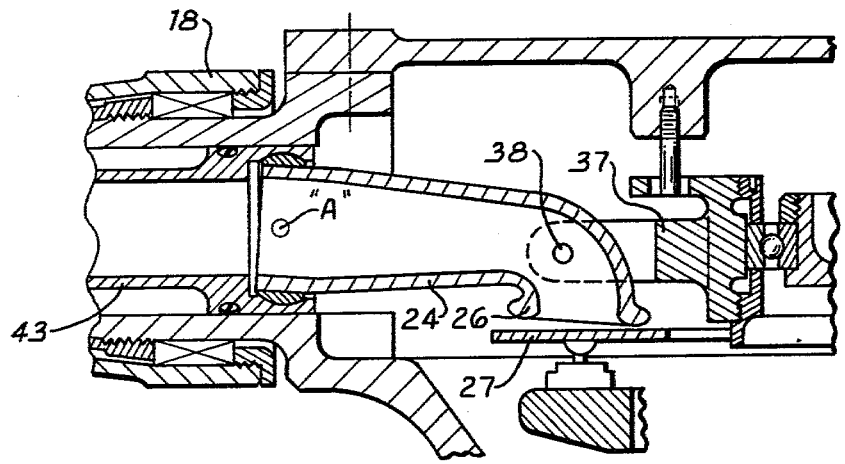
FIG. 3 is a partial sectional view similar to FIG. 2 only showing a nozzle in a deflected position.

Referring still to FIG. 2 of the drawings, a forked nozzle carrier 37 straddles one end of air duct 24 and air nozzle 26 is fixed to carrier 37 by pin 38. As air duct 24 is rotatable, with respect to flex ring 27, nozzle carrier 37 is rotatably mounted to standpipe 31 by bearing 39. It can thus be seen that air nozzle 26 is effectively grounded to the air frame structure, yet is rotatable relative to flex ring 27. Air duct 24 has a ball-type end 41 on its outboard end, and end 41 engages in a socket joint 42 in air duct 43. As shown in FIG. 3 of the drawings, as air nozzle 26 is pinned to forked nozzle carrier 37, air duct 24 effectively pivots about point "A". By this arrangement, when rotor blades 18 rise due to increased thrust, air duct 43 will rise, however, air duct 43 will pivot about point "A" and, consequently, the gap between air nozzle 26 and flex ring 27 will close. Thus feedback will reverse its sense so that it becomes negative and the system will be stable. An O-ring 44 is provided on the in-board end of air duct 43 for sealing.

Figure 4:
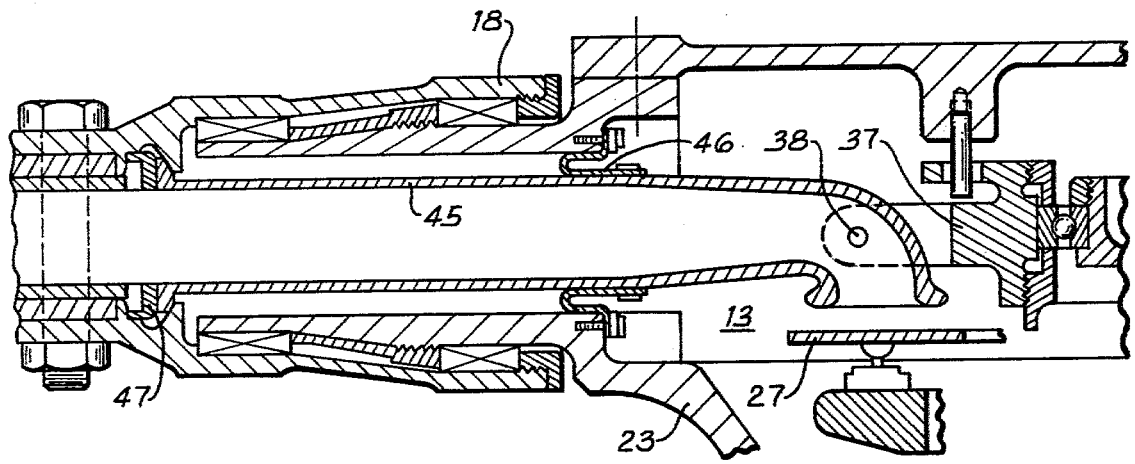
FIG. 4 is a partial sectional view showing another embodiment of a nozzle.

Referring now to FIG. 4 of the drawings, there is shown an embodiment wherein a one-piece duct 45 is used in lieu of the two piece unit shown in FIGS. 2 and 3 of the drawings. The outboard end of duct 45 is provided with a spherical surface 46 which engages with a mating surface 47 on rotor hub 18. The in-board end of duct 45 is pivotally attached to nozzle carrier 37 by pin 38. A flexible curtain 46 is provided about duct 45 and attached to pitch axle 23 to prevent loss of air from air plenum 13. Also, a gasket 47 is provided at the outboard end of duct 45 to provide for air sealing.

Figure 5:
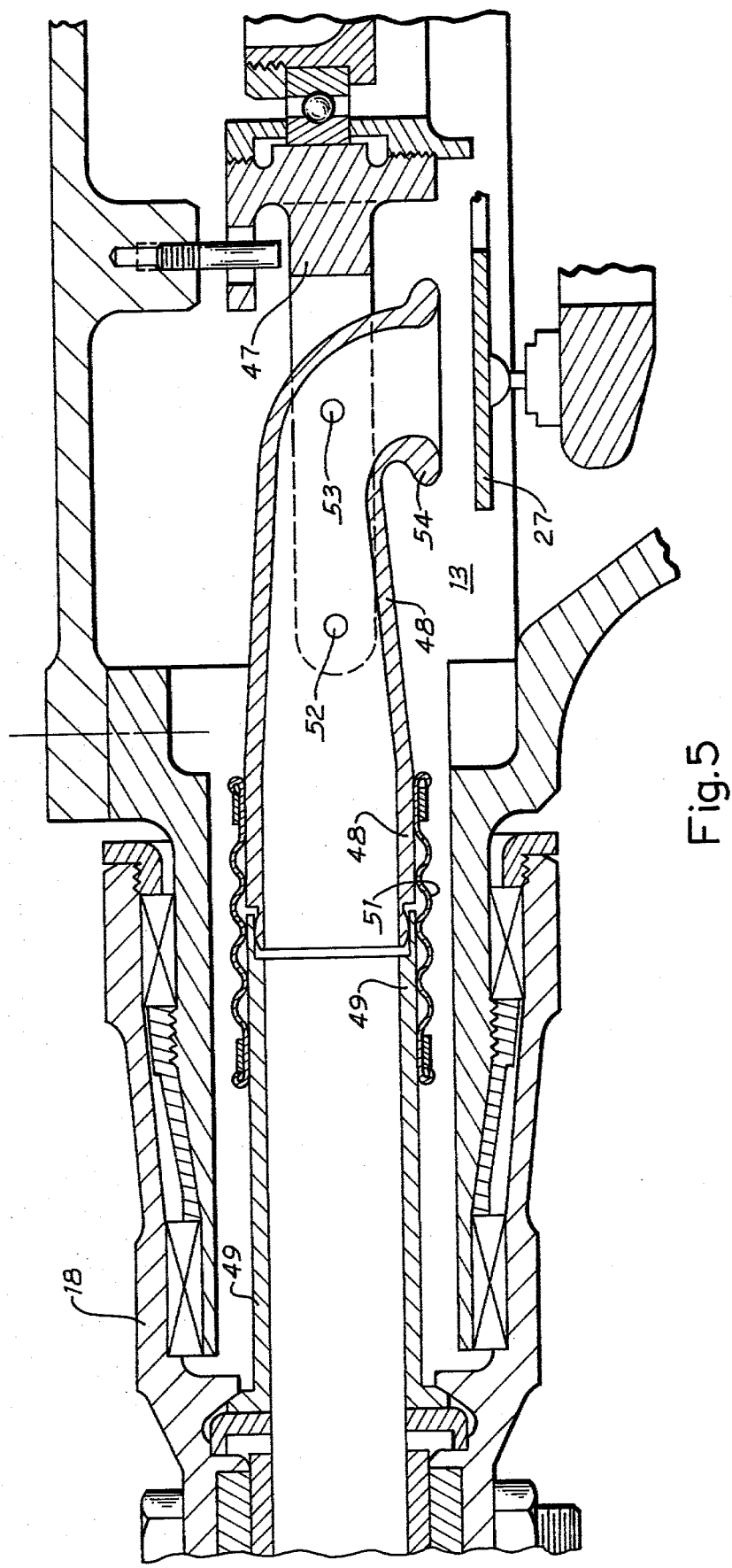
FIG. 5 is a partial sectional view showing an arrangement in which the inboard end of a nozzle is rigidly attached to a nozzle carrier.

Referring now to FIG. 5 of the drawings, another embodiment is shown for the air ducts which carry air from plenum 13 to the rotor blades 18. Each duct is comprised of an inner duct 48 and an intermediate duct 49. The outboard end of inner duct 48 is provided with a radius end so that inner duct 48 can fit within duct 49, and the two ducts can pivot relative to one another. A flexible sleeve 51 is provided at the joint between ducts 48 and 49 to prevent loss of air. The in-board end of inner duct 48 is immobilized by pinning to nozzle carrier 37 by a pair of pins 52 and 53. In this embodiment, when a rotor blade 18 rises due to increased thrust, there is relative movement between ducts 48 and 49, however, the in-board end of duct 48 remains stationary and the gap between air nozzle 54 and flex ring 27 does not change.

It can thus be seen that the present invention provides improved means for minimizing and controlling gap changes in a circulation control pneumatic valve.

Obviously many modifications and variations of the present invention are possible in the light of the above teachings. It is therefore to be understood that the invention may be practiced otherwise than as specifically described.

I claim:

1. In a system for ventilated helicopter rotor blades, a rotor assembly for controlling the air flow into the blades comprising,
    a stationarily mounted rotor mast,
    a rotor hub rotatably mounted on said rotor mast, said rotor mast and hub forming a plenum for maintaining air fed thereinto,
    a plurality of rotor blades attached to said rotor hub,
    a plurality of air ducts carried one each by each said rotor blade, each duct having a downwardly extending nozzle section extending into said plenum,
    means for regulating flow of air into each downwardly extending nozzle section, and
    means for restricting movement of said downwardly extending nozzle section when said air duct is deflected by deflection of said rotor blades.

2. The system of claim 1 wherein said means for restricting movement of said downwardly extending nozzle section comprises a nozzle carrier rotatably mounted to said rotor mast and means for attaching each said nozzle section to said nozzle carrier.

3. The system of claim 2 wherein each said nozzle section is pivotally attached to said nozzle carrier.

4. The system of claim 2 wherein each said nozzle section is rigidly attached to said nozzle carrier.

5. In a system for ventilated helicopter rotor blades, a rotor assembly for controlling the air flow into the blades comprising,
    a stationarily mounted rotor mast,
    a rotor hub rotatably mounted on said rotor mast, said rotor mast and hub forming a plenum for maintaining air fed thereinto,
    a plurality of rotor blades attached to said rotor hub,
    a plurality of air ducts carried one each by each said rotor blade, each duct having a downwardly extending nozzle section extending into said plenum,
    an annular flex plate positioned below said downwardly extending nozzle sections,
    means for moving said flex plate relative to said downwardly extending nozzle sections for regulating flow of air into said air ducts,
    a nozzle carrier rotatably mounted to said rotor mast, and
    means for attaching each said nozzle section to said nozzle carrier.

6. The system of claim 5 wherein each said nozzle section is pivotally attached to said nozzle carrier.

7. The system of claim 5 wherein each said nozzle section is rigidly attached to said nozzle carrier.

8. In a system for ventilated helicopter rotor blades, a rotor assembly for controlling the air flow into the blades comprising,
    a stationarily mounted rotor mast,
    a rotor hub rotatably mounted on said rotor mast, said rotor mast and hub forming a plenum for maintaining air fed thereinto,
    a plurality of rotor blades attached to said rotor hub,
    a plurality of air ducts carried one each by each said rotor blade, each duct having a downwardly extending nozzle section extending into said plenum,
    an annular flex plate positioned below said downwardly extending nozzle sections,
    a stationarily mounted standpipe,
    a pivotal support slidably mounted on said standpipe for supporting said annular flex plate,
    linkage means for moving said pivotal support to position said flex plate relative to said downwardly extending nozzle sections for regulating flow of air into said air ducts,
    spring means encompassing said standpipe and engaging said pivotal support for eliminating free-play from said linkage means,
    a nozzle carrier rotatably mounted on said standpipe, and
    means for attaching each said nozzle section to said nozzle carrier.

9. The system of claim 8 wherein each said nozzle section is pivotally attached to said nozzle carrier.

10. The system of claim 8 wherein each said nozzle section is rigidly attached to said nozzle carrier.

* * * * *